Patented Sept. 19, 1950

2,523,114

UNITED STATES PATENT OFFICE 2,523,114

METHOXY DICYCLOPENTADIENE MERCURIC CHLORIDE FOR CONTROLLING PARASITES

Roger S. Hawley, Linden, N. J., assignor to Standard Oil Development Company, a corporation of Delaware No Drawing. Application January 22, 1949, Serial No. 72,254

5 Claims. (Cl. 117—138.5)

This invention relates to new and useful improvements in parasiticidal preparations and more particularly to improved fungicides, insecticides and germicides. This invention also relates to methods of protecting organic material subject to attack by low orders of organisms.

It has now been found that methoxy dicyclopentadiene mercuric chloride is extremely effective for destroying or checking the growth of bacteria, fungi and insects. This compound may thus be used as a novel ingredient of parasiticidal compositions and is especially effective for the prevention of fungus growth and bacterial attack on textiles such as cotton.

Methoxy dicyclopentadiene mercuric chloride $ClHg.C_{10}H_{12}.OCH_3$ is a white or light gray solid with a melting point between 141°–142° C. The preparation of methoxy dicyclopentadiene mercuric chloride is known and is given in the literature (Hofmann and Seiler Ber. 39, 3187–90 (1906)). One of the ways of preparing it is by dissolving mercuric chloride in methyl alcohol, adding dicyclopentadiene, allowing the mixture to stand for a period of several hours or days, and then cooling the mixture to crystallize out the product which can then be filtered.

The compound of this invention may be applied to parent materials to rid them of harmful organisms and to prevent fungus growth and mildew formation. Some of the parent materials to which it may be applied for protective purposes are leather, wood, fur, wool, coated fabrics, and other substances.

Methoxy dicyclopentadiene mercuric chloride may be applied as a diluted dust mixture with a carrier such as clay talc or clay bentonite. It may also be applied as a spray in a liquid carrier either as a solution in a solvent or as a suspension in a non-solvent such as water. When applied as a spray in water it may be desirable to incorporate a wetting agent.

Among the solvents for methoxy dicyclopentadiene mercuric chloride are hydrocarbons such as petroleum fractions, alcohols, ketones, esters, chlorinated hydrocarbons including methyl chloride and other so-called "aerosol bomb" solvents, and the like. The fact that methoxy dicyclopentadiene mercuric chloride is more soluble than mercuric chloride in organic solvents makes it much more adapted for applying to textiles than mercuric chloride itself. The lesser solubility of methoxy dicyclopentadiene mercuric chloride in water renders materials coated with it resistant to weathering. Solutions of methoxy dicyclopentadiene mercuric chloride may first be prepared in relatively concentrated form, i. e., over 10%, in solvents such as $CCl_4$ and acetone and these concentrates can then be diluted for use in textile dipping baths.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as ricinoleic acid ester of sorbitol, and petroleum sulfonates of $C_{10}$ to $C_{20}$ length. The non-ionic emulsifying agents such as the ethylene oxide products of alkylated phenols may also be used. It is to be understood that these and similar compounds are intended when the term wetting agent is used hereafter.

By virtue of its solubility in the "Freons," i. e., $CCl_3F$, $CCl_2F_2$, $CClF_3$, $CHCl_2F$, etc., and other aerosol type solvents, methoxy dicyclopentadiene mercuric chloride is adapted for use in aerosol compositions for space spray and fumigation applications. When put up in this form, it can be dispensed in the conventional pressure containers known in the art. It can of course be volatilized by application of heat in the area to be fumigated.

The compound of this invention is readily compatible with other insecticidal and fungicidal mixtures and possesses a high degree of chemical stability in the atmosphere which makes it ideally suitable for use as agricultural spray residues. It may therefore be admixed with carriers that are themselves active such as other parasiticides, hormones, herbicides, fertilizers, stomach and contact insecticides such as the arsenates, fluorides, rotenone and the various fish poisons and organic insecticides such as di (p-) chlorophenyl - trichloroethane. Benzene hexachloride and similar products may also be advantageously added.

For use in treating textiles, volatiles and readily vaporizable solvents may be used as carriers for methoxy dicyclopentadiene mercuric chloride. Suitable carriers include, for example, aliphatic, araliphatic, and aromatic organic solvents, such mineral or petroleum spirits, carbon tetrachloride, ethylene dichloride, dichloro diethyl ether, di-isopropyl ether, petroleum ether, naphtha, kerosene, ethylene glycol, benzene, toluene, alcohols, acetone, mixtures thereof and the like, aqueous solutions or suspensions, etc. Aside from readily vaporizable solvents, materials such as viscous oils, various polymers and plastic resins, creosote oils, water-proofing emulsions such as of aluminum acetate, soap, and wax, etc. may also be used as carriers for the present agent.

Generally about 5-35% of the methoxy dicyclopentadiene mercuric chloride is dissolved or suspended in the carrier, although more or less may be used, depending on the character of the carrier and agent used.

In treating textiles, such as cotton, linen, jute, bagasse and the like, including keratinous textiles and fabrics such as wool, the present agent may be applied thereto by dipping, spraying, or brushing with solutions of the agent, preferably in a volatile solvent, such as benzene. As a rule, at least 0.001% and generally more than 0.01% by weight (on the basis of treated cloth) of the agent is applied to the cloth. Preferred is the impregnation of the textile with 0.01 to 1% or more of methoxy dicyclopentadiene mercuric chloride.

After the textiles have been treated with the present agent, they may be subsequently treated with other agents for various purposes.

The present method of preventing attack on textiles by fungi and bacteria may be applied to fish-nets, canvas-goods, such as tents, awnings, ground-sealing covers, etc., burlap sacks, fabrics used in reinforcing revetment lining of asphalt and the like, etc.

This invention will be better understood by reference to the following examples of the preparation of the compound of this invention and its use for the stated purposes.

Example 1

70 grams of mercuric chloride was dissolved in 400 ccs. of acetone-free methyl alcohol and the solution was filtered. 10 ccs. of distilled dicyclopentadiene was added to the filtrate with stirring. The solution became yellow. A precipitate gradually formed. After the resulting mixture had stood for 2 days at room temperature, it was cooled to 0°-5° C. and filtered. 20 grams of a light gray colored product was obtained which melted at 134° C. This product was recrystallized from dilute methyl alcohol (2 vols. methyl alcohol to 1 vol. water) and a white colored product was obtained which had a melting point of 141°-142° C.

Example 2

Methoxy dicyclopentadiene mercuric chloride was tested for insecticidal activity.

The following tabulated data show that methoxy dicyclopentadiene mercuric chloride possesses excellent insecticidal activity against several test organisms.

| Compound | Contact Insecticidal Activity (Per Cent Kill) | | Bloodstream Insecticidal Activity (Per Cent Kill) | |
|---|---|---|---|---|
| | Blattella germanica (German [1] Roach) | Omelpeltus Sociatus (Milkweed [1] Bug) | Periplanitus Americana (American Roach [2]) | |
| | | | Male | Female |
| Methoxy dicyclopentadiene mercuric chloride | 55 | 100 | 100 | 100 |

[1] Figures in columns represent per cent of insects killed within 96 hours following a two-minute immersion in a 0.25% aqueous suspension of compound.
[2] Figures in columns represent per cent of insects killed after 0.5 mg. of compound per gram of body weight was injected in blood stream of insect.

Example 3

Methoxy dicyclopentadiene mercuric chloride was tested for fungicidal activity.

In slide tests made on spores of the fungi *Sclerotinia fructicola* and *Alteneria solani* using the slide technique described by S. E. A. McCallan et al., Contributions Boyce Thompson Institute 4,233 (1932); 9,249 (1938); 10,329 (1939); 12,490 (1941); 12,431 (1942), 10 parts of methoxy dicyclopentadiene mercuric chloride (from example given above) per million parts of water gave a 100% kill of both fungi and 1 part of the chemical per million parts of water gave 50% kill of both fungi. The spores were 100% viable.

It is to be understood that the invention is not limited to the specific examples which have been offered merely as illustration and that modifications may be made within the scope of the appended claims without departing from the spirit of the invention.

What is claimed is:

1. A textile article comprising in combination a textile impregnated with at least 0.001% by weight of methoxy dicyclopentadiene mercuric chloride.

2. A solid article of manufacture coated with methoxy dicyclopentadiene mercuric chloride, and possessing fungus resisting properties, said article being susceptible to fungus attack when in the uncoated form.

3. In a process for controlling the attack of parasites on textile materials, the improvement which comprises exposing the textile material to the action of a volatile organic solvent solution of methoxy dicyclopentadiene mercuric chloride until the textile material after drying contains at least 0.001% by weight of methoxy dicyclopentadiene mercuric chloride.

4. A process as in claim 3 in which the concentration of methoxy dicyclopentadiene mercuric chloride in the organic solvent solution is in the range of about 5% to 35%.

5. A fungicidal composition consisting essentially of methoxy dicyclopentadiene mercuric chloride as the active ingredient admixed with a surface tension reducing agent for water selected from the group consisting of long-chain alcohol sulfates, sulfonated amide derivatives, sulfonated ester derivatives, sulfonated aromatic derivatives, sulfonated alkylaryl derivatives, and petroleum sulfonates of $C_{10}$ to $C_{20}$ length.

ROGER S. HAWLEY.

REFERENCES CITED

The following references are of record in the file of this patent:

UNITED STATES PATENTS

| Number | Name | Date |
|---|---|---|
| 2,044,773 | Conn | June 23, 1936 |
| 2,321,023 | Goodhue et al. | June 8, 1943 |
| 2,382,038 | Bruson | Aug. 14, 1945 |

OTHER REFERENCES

Hofmann et al., Berichter, vol. 39, pages 3187–90, 1906.